(12) United States Patent
Nagamine et al.

(10) Patent No.: US 9,723,261 B2
(45) Date of Patent: Aug. 1, 2017

(54) INFORMATION PROCESSING DEVICE, CONFERENCE SYSTEM AND STORAGE MEDIUM

(71) Applicants: Shoh Nagamine, Kanagawa (JP); Takuya Imai, Tokyo (JP); Kenichiro Morita, Tokyo (JP)

(72) Inventors: Shoh Nagamine, Kanagawa (JP); Takuya Imai, Tokyo (JP); Kenichiro Morita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 120 days.

(21) Appl. No.: 14/025,159

(22) Filed: Sep. 12, 2013

(65) Prior Publication Data

US 2014/0118475 A1 May 1, 2014

(30) Foreign Application Priority Data

Oct. 31, 2012 (JP) ................. 2012-240702

(51) Int. Cl.
   - *H04N 7/14* (2006.01)
   - *H04L 12/18* (2006.01)
   - *H04M 3/56* (2006.01)

(52) U.S. Cl.
   CPC ......... *H04N 7/147* (2013.01); *H04L 12/1822* (2013.01); *H04M 3/567* (2013.01)

(58) Field of Classification Search
   None
   See application file for complete search history.

(56) References Cited

U.S. PATENT DOCUMENTS

| 5,617,539 A * | 4/1997 | Ludwig et al. ............... 709/205 |
| 6,553,515 B1 * | 4/2003 | Gross .................. H04L 12/2602 |
| | | 709/224 |
| 7,529,270 B2 | 5/2009 | Uramatsu et al. |
| 2003/0016632 A1* | 1/2003 | Refai ..................... H04M 3/56 |
| | | 370/260 |
| 2003/0149724 A1* | 8/2003 | Chang .......................... 709/204 |

(Continued)

FOREIGN PATENT DOCUMENTS

| JP | 3852752 | 12/2006 |
| JP | 2008-227693 | 9/2008 |

(Continued)

*Primary Examiner* — Fan Tsang
*Assistant Examiner* — Jeffrey Lytle
(74) *Attorney, Agent, or Firm* — Oblon, McClelland, Maier & Neustadt, L.L.P.

(57) ABSTRACT

A disclosed information processing device transmits and receives, as elements, audio information of inputted audio, video information of video taken, and screen image information of a screen image to be shared. The information processing device includes a determination criteria storing unit configured to store determination criteria created in terms of the elements for determining whether to continue transmission or reception of the elements, an information obtaining unit configured to obtain specified information related to the elements from the elements being transmitted and received, and an element determination unit configured to determine from the obtained information whether to continue or not the transmission or the reception of the elements by referring to the determination criteria.

12 Claims, 13 Drawing Sheets

| TYPE OF ELEMENT | OBTAINED INFORMATION | CONTENT OF PROCESS |
|---|---|---|
| VIDEO INFORMATION | TRANSMITTING VIDEO IS ALL BLACK | STOP TRANSMISSION OF VIDEO INFORMATION |
| | TRANSMITTING VIDEO IS ALL WHITE | |
| | THERE IS NO FACE IN TRANSMITTING VIDEO | |
| | THERE IS NO CHANGE IN TRANSMITTING VIDEO FOR A CERTAIN PERIOD OF TIME | |
| | THERE IS MORE THAN CERTAIN AMOUNT OF NOISE IN TRANSMITTING VIDEO | |
| VOICE INFORMATION | THERE IS NO INPUT FOR TRANSMITTING VOICE | STOP TRANSMISSION OF VOICE INFORMATION |
| | THERE IS NO CHANGE IN TRANSMITTING VOICE FOR A CERTAIN PERIOD OF TIME | |
| | THERE IS MORE THAN CERTAIN AMOUNT OF NOISE IN TRANSMITTING VOICE | |
| SCREEN IMAGE INFORMATION | THERE IS NO CHANGE IN TRANSMITTING DATA FOR A CERTAIN PERIOD OF TIME | STOP TRANSMISSION OF SCREEN IMAGE INFORMATION |
| | THERE IS NO INPUT FOR TRANSMITTING DATA FOR A CERTAIN PERIOD OF TIME | |
| | THERE IS MORE THAN CERTAIN AMOUNT OF NOISE IN TRANSMITTING DATA | |

(56) References Cited

U.S. PATENT DOCUMENTS

| | | | |
|---|---|---|---|
| 2005/0157660 A1* | 7/2005 | Mandato | H04L 12/5695 370/254 |
| 2006/0126604 A1* | 6/2006 | Kim | H04L 29/06027 370/356 |
| 2007/0274284 A1* | 11/2007 | Dendukuri | H04L 12/2602 370/351 |
| 2008/0267282 A1* | 10/2008 | Kalipatnapu et al. | 375/240.01 |
| 2009/0282339 A1* | 11/2009 | Van Melle | G06Q 10/10 715/730 |
| 2011/0038362 A1* | 2/2011 | Vos | G10L 19/012 370/352 |
| 2011/0141220 A1* | 6/2011 | Miura | H04L 12/40013 348/14.02 |
| 2013/0215213 A1* | 8/2013 | Power et al. | 348/14.02 |
| 2013/0242775 A1* | 9/2013 | Taylor | H04L 65/1006 370/252 |
| 2013/0297819 A1* | 11/2013 | Mittal | H04L 43/0876 709/232 |
| 2014/0003450 A1* | 1/2014 | Bentley | H04N 7/15 370/468 |
| 2014/0111600 A1* | 4/2014 | Schaefer | H04N 5/232 348/14.08 |

FOREIGN PATENT DOCUMENTS

| | | |
|---|---|---|
| JP | 2009-152808 | 7/2009 |
| JP | 4977800 | 7/2012 |

* cited by examiner

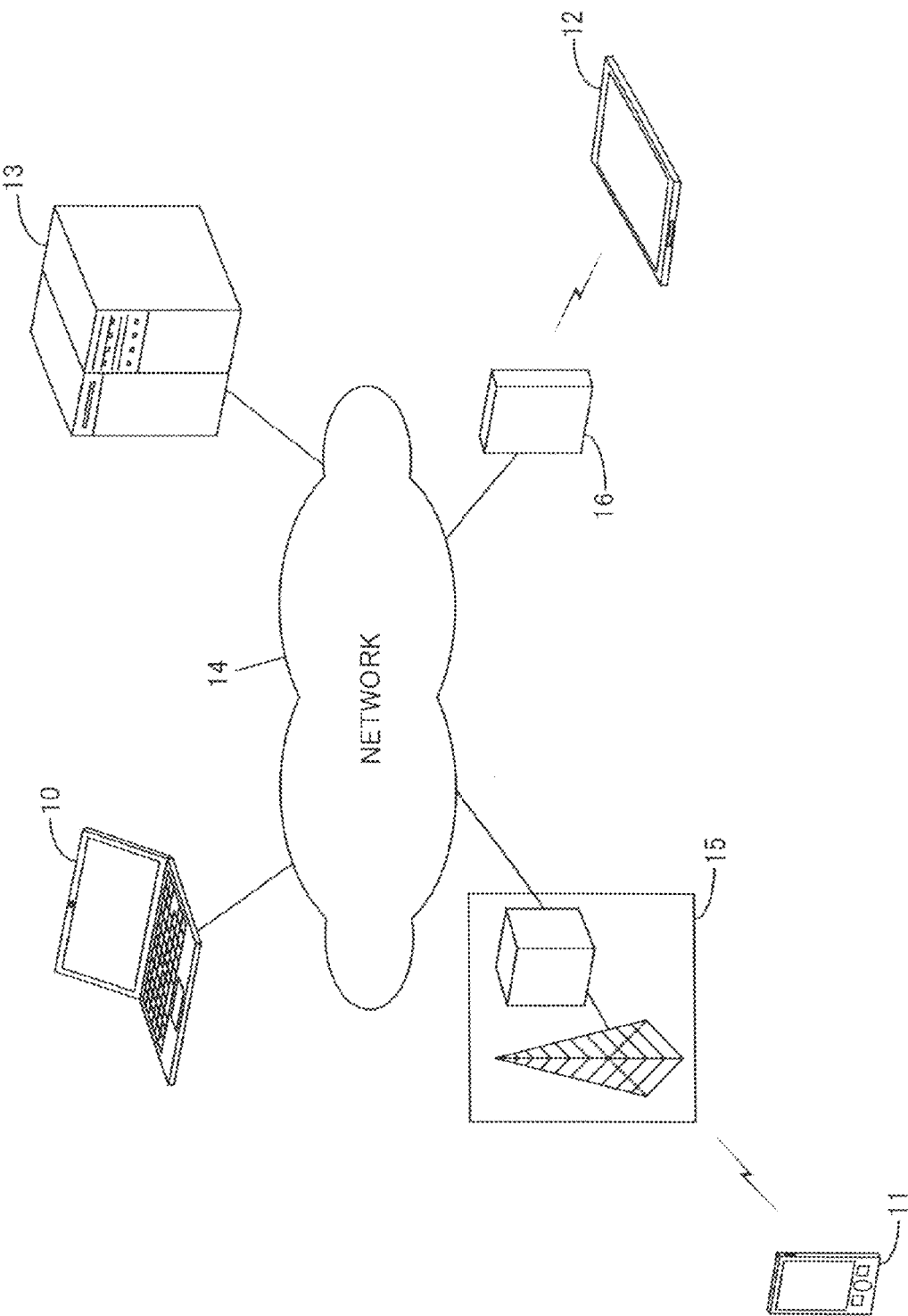

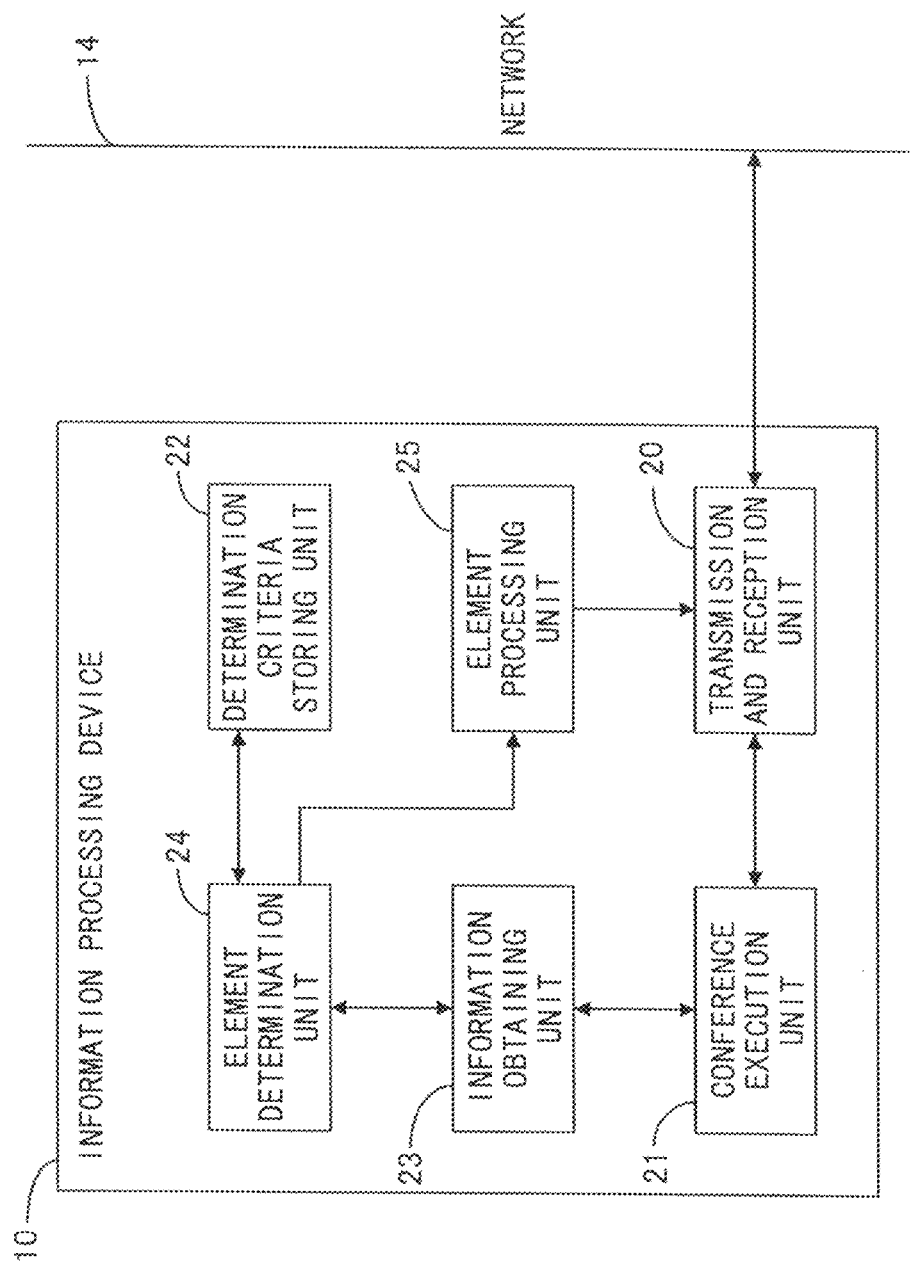

FIG.3

| TYPE OF ELEMENT | SPECIFIED INFORMATION |
|---|---|
| VIDEO INFORMATION | EXISTENCE OR NON-EXISTENCE OF FACE RECOGNIZED BY FACE RECOGNITION (NUMBER OF FACES) |
| | COLOR DISTRIBUTION |
| | SPATIAL CHANGE |
| | CHANGE AS TIME GOES BY |
| VOICE INFORMATION | VOICE LOUDNESS |
| | CHANGE AS TIME GOES BY |
| SCREEN IMAGE INFORMATION | TYPE OF DATA |
| | EXISTENCE OR NON-EXISTENCE OF CHANGE AS TIME GOES BY |
| | EXISTENCE OR NON-EXISTENCE OF INPUT FOR DATA |

FIG.4

| TYPE OF ELEMENT | DETERMINATION CRITERIA |
|---|---|
| VIDEO INFORMATION | IS THERE FACE IN CONFERENCE VIDEO? |
| | IS VIDEO TINGED WITH UNIFORM COLOR? |
| | IS THERE SPATIAL CHANGE IN VIDEO? |
| | IS THERE CHANGE AS TIME GOES BY? |
| VOICE INFORMATION | LOUDNESS OF VOICE HAS BECOME LOW? |
| | IS THERE CHANGE IN VOICE AS TIME GOES BY? |
| SCREEN IMAGE INFORMATION | WHAT TYPE OF DATA ARE EXCHANGED? |
| | IS THERE CHANGE IN DATA ITSELF AS TIME GOES BY? |
| | IS THERE ANY INPUT FOR DATA? |

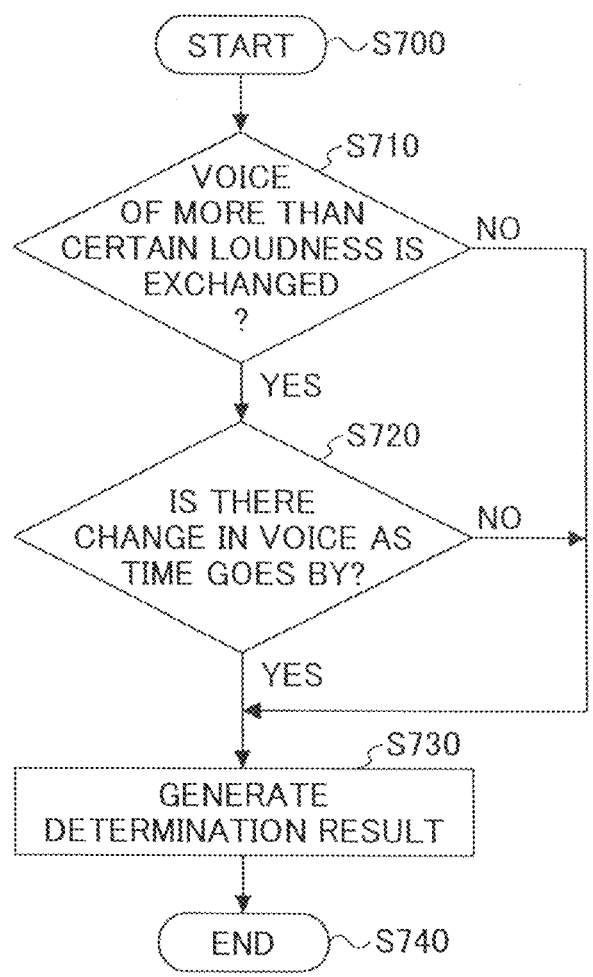

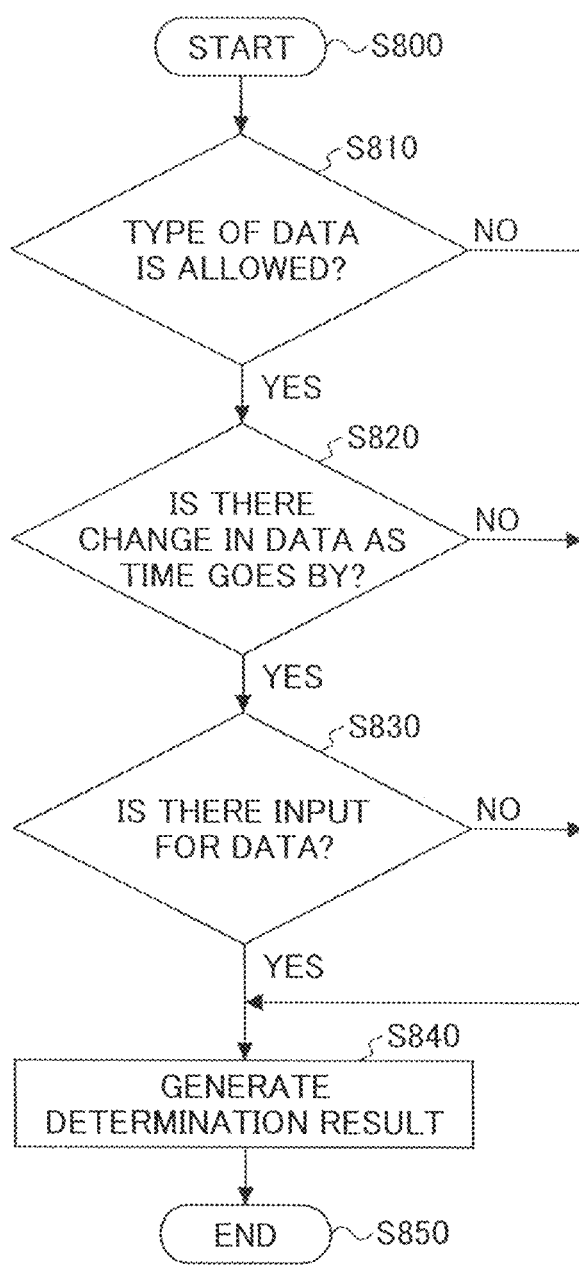

FIG.12

| TYPE OF ELEMENT | CONTENT OF PROCESS |
|---|---|
| VIDEO INFORMATION | STOP TRANSMISSION OF VIDEO |
| | STOP RECEPTION OF VIDEO |
| VOICE INFORMATION | STOP TRANSMISSION OF VOICE |
| | STOP RECEPTION OF VOICE |
| SCREEN IMAGE INFORMATION | STOP TRANSMISSION OF DATA |
| | STOP RECEPTION OF DATA |

FIG.13

| TYPE OF ELEMENT | OBTAINED INFORMATION | CONTENT OF PROCESS |
|---|---|---|
| VIDEO INFORMATION | TRANSMITTING VIDEO IS ALL BLACK | STOP TRANSMISSION OF VIDEO INFORMATION |
| | TRANSMITTING VIDEO IS ALL WHITE | |
| | THERE IS NO FACE IN TRANSMITTING VIDEO | |
| | THERE IS NO CHANGE IN TRANSMITTING VIDEO FOR A CERTAIN PERIOD OF TIME | |
| | THERE IS MORE THAN CERTAIN AMOUNT OF NOISE IN TRANSMITTING VIDEO | |
| VOICE INFORMATION | THERE IS NO INPUT FOR TRANSMITTING VOICE | STOP TRANSMISSION OF VOICE INFORMATION |
| | THERE IS NO CHANGE IN TRANSMITTING VOICE FOR A CERTAIN PERIOD OF TIME | |
| | THERE IS MORE THAN CERTAIN AMOUNT OF NOISE IN TRANSMITTING VOICE | |
| SCREEN IMAGE INFORMATION | THERE IS NO CHANGE IN TRANSMITTING DATA FOR A CERTAIN PERIOD OF TIME | STOP TRANSMISSION OF SCREEN IMAGE INFORMATION |
| | THERE IS NO INPUT FOR TRANSMITTING DATA FOR A CERTAIN PERIOD OF TIME | |
| | THERE IS MORE THAN CERTAIN AMOUNT OF NOISE IN TRANSMITTING DATA | |

ID
INFORMATION PROCESSING DEVICE, CONFERENCE SYSTEM AND STORAGE MEDIUM

BACKGROUND OF THE INVENTION

1. Field of the Invention

The disclosures herein generally relate to an information processing device for controlling information transmission and reception, a conference system including two or more information processing devices and a storage medium storing a program for the information processing device for performing the controlling.

2. Description of the Related Art

As a tool for having a meeting with a remote party, a video conference system or a web conference system is used which enables a user to communicate with the remote party while monitoring facial expressions of the remote party. In recent years, in accordance with the expansion of capacity in the Internet connections, qualities of conference video and audio have been improved and opportunities for using these conference systems have been increased.

Many of network environments used for conference communications are, however, not built to have enough capacity for transmitting video and audio of sufficient qualities. Therefore, in general, qualities of conference video and audio depend on the network environments that are used for the conference communications.

For example, in a video conference or a web conference through normal Internet connections or radio networks, there is a case where a communication band for video and audio in a network becomes narrow, or a case where a network band that can be used changes a lot. In these cases, there are problems such as a phenomenon that conference video is delayed a lot, or a problem in which a conference cannot be continued due to a phenomenon that the conference ends suddenly.

As a result, a technology is proposed in which, in order to improve continuity of a conference, bands are controlled, which bands are used for transmission of various types of information such as video, audio and data for displaying shared screen images, in accordance with a situation of a conference or a band usage situation during a conference (see, for example, Patent Document 1.)

[Patent Document 1] Japanese Patent No. 3852752

SUMMARY OF THE INVENTION

In the technology disclosed in Patent Document 1, bands are assigned for video, audio and data in accordance with priorities. As a result, bands are assigned to them more or less even in an environment where a network band is extremely narrow so that only a band necessary for audio communication is available, or in an environment where a useable network band changes a lot. And it is likely that the phenomena described above occur and that it becomes difficult to continue the conference.

It is a general object of at least one embodiment of the present invention to provide an information processing device for transmitting and receiving, as transmission and reception elements, audio information that is inputted, video information that is taken, and screen image information that is to be shared. The information processing device includes a determination criteria memory unit configured to store determination criteria created for the elements for determining whether transmission and reception of the elements should be continued or not, an information obtaining unit configured to obtain specified information related to the elements from transmitted and received elements, an element determination unit configured to refer to the determination criteria and to determine from the obtained information whether to continue transmission and reception of the elements.

By providing the information processing device according to the present embodiment, regarding the elements of which the continuation of transmission and reception is not necessary, they can be dynamically removed and it becomes easy to secure a band for necessary elements. By this, it becomes possible to improve the continuity of a conference even under an environment where a network band is extremely narrow, or an environment where a network band changes a lot.

BRIEF DESCRIPTION OF THE DRAWINGS

Other objects and further features of embodiments will be apparent from the following detailed description when read in conjunction with the accompanying drawings.

FIG. 1 is a drawing illustrating an example of a configuration of a conference system of an embodiment of the present invention.

FIG. 2 is a functional block diagram illustrating an example of an information processing device included in the conference system in FIG. 1.

FIG. 3 is a drawing illustrating a table in which types of elements are associated with specified information.

FIG. 4 is a drawing illustrating a table in which types of elements are associated with determination criteria.

FIG. 7 is a flowchart in which flows of determination processes whether to continue transmission of audio information as one of the elements are shown.

FIG. 8 is a flowchart in which flows of determination processes whether to continue transmission of screen image information as one of the elements are shown.

FIG. 12 is a drawing illustrating a table in which types of elements are associated with content of processes.

FIG. 13 is a drawing illustrating a table in which types of elements are associated with obtained information and content of processes.

DESCRIPTION OF THE PREFERRED EMBODIMENTS

Figure 5:
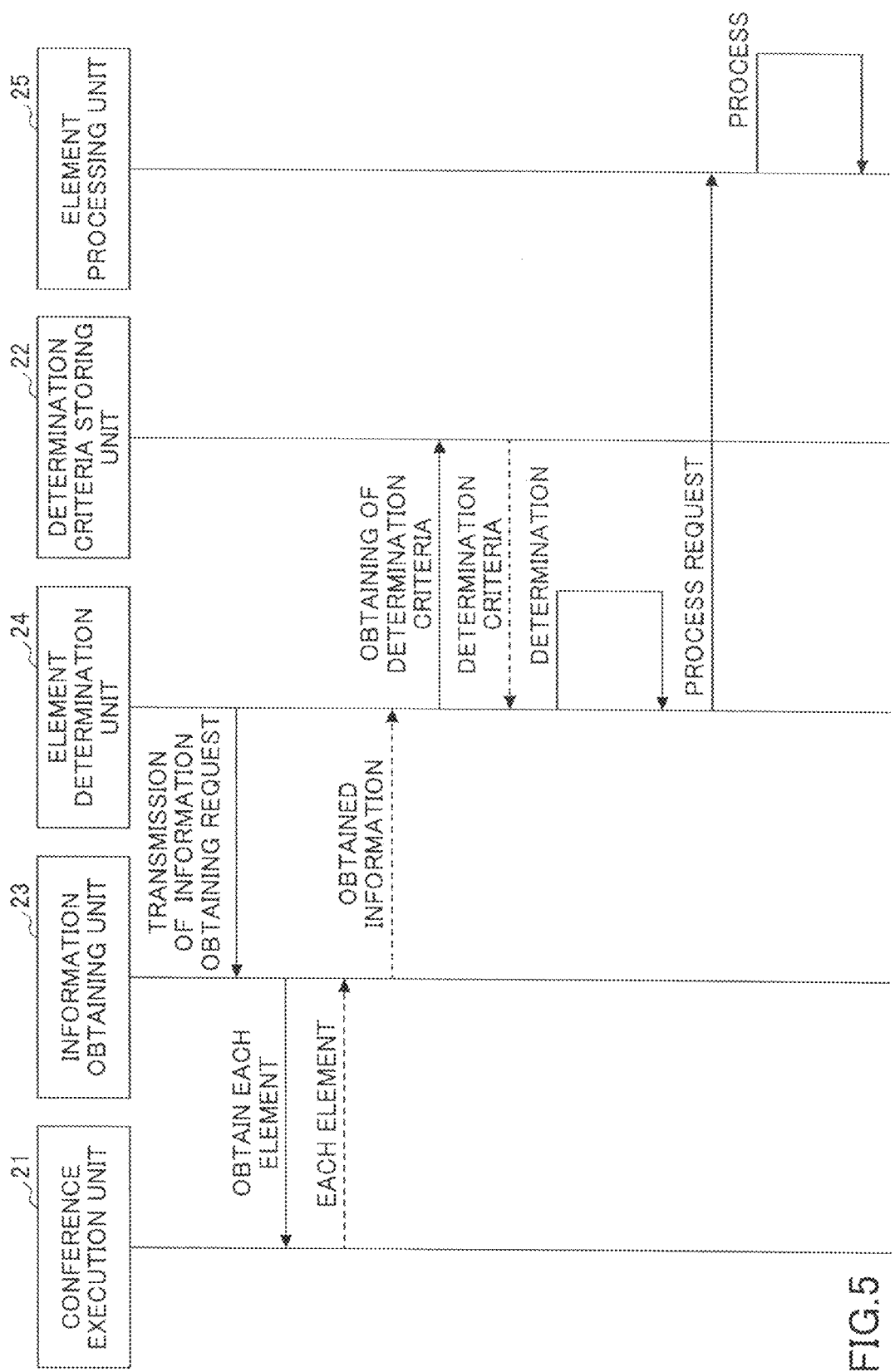
FIG. 5 is a sequence chart in which flows of processes performed by the information processing device are shown.

In the following, embodiments of the present invention will be described with reference to the accompanying drawings.

FIG. 1 is a drawing illustrating an example of a configuration of a conference system of an embodiment of the present invention. This conference system is a system adopted for having a conference between remote locations, and is configured to include a plurality of information processing devices 10 through 12 and a control server 13. The information processing devices 10 through 12 are placed remotely from each other. In FIG. 1, the information processing devices 10 through 12 are configured to access the control server 13 through a network 14 and exchange information with each other through the control server 13.

Although, in FIG. 1, the information processing devices 10 through 12 are placed in areas that are physically remote from each other, there may be a case where, for example, two of the information processing devices 10 and 11 are placed in the same area, and the information processing device 12 is placed in a remote area. Also, the number of the information processing devices are not limited to three; it may be two, four or more.

As the information processing devices 10 through 12, general purpose devices such as PCs, smart phones, mobile phones, and tablet terminals can be used. In FIG. 1, the information processing device 10 is a notebook PC and is connected to the network 14 through a communication cable. The information processing device 11 is a smart phone and is configured to perform radio communications with a base station 15 that is connected to the network 14. The information processing device 12 is a tablet terminal and is configured to perform radio communications with an access point 16 that is connected to the network 14.

Each of the information processing devices 10 through 12 includes, as hardware needed for having a conference, a mike (audio input unit) for a user, who is a participant of the conference, to input the audio uttered by the user. Also, each of the information processing devices 10 through 12 includes a speaker (audio output unit) to output audio of other parties. Furthermore, each of the information processing devices 10 through 12 includes a camera (image taking unit) to take pictures of the user and to output them as images, and a display or a projector (display unit) for displaying faces of the other parties or screen images to be shared, etc.

Each of the information processing devices 10 through 12 includes a CPU for performing various types of processes, a memory device such as a ROM, a RAM, a HDD, etc., for storing various types of applications, data, etc., and a network interface for connecting to the network 14. Note that as an image taking unit, a CCD (Charged Coupled Device) that digitizes views of objects by transforming light into electric charges can be used. Other than the CCD, a CMOS (Complementary Metal Oxide Semiconductor), etc., can be used as long as it is capable of taking pictures of objects.

Each of the information processing devices 10 through 12 transmits, as elements of the conference, audio information of audio inputted from the audio input unit, video information of video taken by the image taking unit, and screen image information of screen images that are displayed on the display unit and are to be shared. Also, each of the information processing devices 10 through 12 receives these elements from the other parties of the conference.

The audio information is digitized information of audio. The video information is digitized information of video, and the video may be a moving picture or a still image. Also, the video may include both a moving picture and a still image. Regarding the audio information and the video information, they can be distributed in the form of streaming so that the digitized information can be received and reproduced in real time.

The digitized video information can be transmitted and received using compression coding, and as compression coding technologies, video coding methods in accordance with various standards can be used. As one of such standards, there is, for example, H.264, and H.264/AVC or H.264/SVC can be used. In H.264/SVC, digitized information is coded and divided into multiple channels and transmitted to other parties. As a result, the other parties can perform decoding by combining multiple channels according to a network status or capabilities of reproduction equipment. By doing this, the other parties can take out appropriate errorless digitized information and reproduce it.

The screen image information is digitized information for being displayed as conference materials such as documents, tables, images, video, etc., used by document editing software, spreadsheet software, presentation software, etc. This screen image information is, for example, generated by taking out (capturing) materials displayed on the display unit of the information processing device 10 at a certain time interval, and is transmitted to other information processing devices 11 and 12 at a certain time interval.

The information processing device 10 can display the elements of the conference transmitted by the other information processing devices 11 and 12 in one or more areas of the screen of the display unit according to preset configuration information. Note that the configuration information is information related to displaying the video information and the screen image information. To give an example, the configuration information is for displaying the screen image information in the left half area of the screen and displaying two items of video information in the right half area of the screen divided into two areas of an upper area and a lower area.

The transmission and reception among the information processing devices 10 through 12 are performed through the control server 13. The control server 13, during a conference, authenticates the information processing devices 10 through 12 and controls communications among the information processing devices 10 through 12.

The control server 13 includes as hardware a memory device such as a HDD, etc., a CPU for performing the authentication process and controls and a network interface for connecting to the network 14. Also, the control server 13 can include as necessary a keyboard or a mouse as an input device and a display, etc., as a displaying device.

In the memory device included in the control server 13, for example, an authentication management table is stored. In this authentication management table, device identifiers (device IDs) that are assigned to all of the information processing devices 10 through 12 are associated with passwords and the table is maintained. These device IDs and passwords are used at the time of login for a conference system to have a conference.

Other than these, an address list management table, etc., are stored in the memory device. In the address list management table, a device ID of a conference-requesting information processing device that requests to start a conference is associated with device IDs of information processing devices that are registered as candidates of information processing devices to be addressed, and the table is stored and maintained. Note that in this table, a conference ID for identifying the conference is also associated with the device IDs, stored and maintained.

In the case where users using the information processing devices 10 through 12 are going to have a conference, login screens are opened, and passwords are inputted and transmitted to the control server 13 together with device IDs. Here only passwords and device IDs are transmitted, but it is possible to also utilize user IDs for authentication by having the user IDs inputted and transmitted to the control server 13. The user IDs and the passwords may include any character, number, code, etc. Note that a password authentication is used here, but the authentication may be an IC authentication, a biometric authentication, etc.

The control server 13, upon receiving the device ID and the password, refers to the authentication management table, and searches for the same device ID in the authentication management table. In a certain case, the control server 13 determines whether the password is the same as the one associated with the device ID. In the case where the password is the same, the authentication process is done and the conference is ready to start. In the case where either the device ID or the password is different, or where both of them are different, the authentication process cannot be performed and the login screen is restored.

The information processing devices 10 through 12, after the login, when the conference is selected by users who are participants of the conference, transmit the conference ID to the control server 13 and request for the conference to start. Then, the information processing devices 10 through 12 transmit conference elements such as audio information, video information and screen image information; the control server 13 receives those elements, refers to the address list management table and causes the exchanging of those elements to start.

The network 14 is, for example, the Internet, and communications therein are performed using appropriate protocols such as TCP/IP, etc. The base station 15 includes an antenna for transmission and reception of radio waves with a smart phone as the information processing device 11, and a transformation device for performing protocol transformation, etc., for causing the smart phone to become useable in the network 14. Also, the base station 15 includes a router for performing the routing for appropriate transmission and reception of the conference elements, and a network interface for connecting to the network 14.

The access point 16 includes a function as an access point of a wireless LAN, and as standards for the wireless LAN, for example, IEEE 802.11a/b/g/n are used. The access point 16 is configured to include a network interface for connecting to the network 14, an antenna for performing radio communications, a router for performing the routing for appropriate transmission and reception of the conference elements, etc.

FIG. 2 is a functional block diagram illustrating an example of the information processing device included in the conference system in FIG. 1. Because all of the information processing devices 10 through 12 include the same functions, only the information processing device 10 will be described here. The information processing device 10 includes a transmission and reception unit 20 for transmitting and receiving, as the elements, the audio information of inputted audio, the video information of the video taken, and the screen image information of the screen images to be shared. This transmission and reception unit 20 is implemented by the network interface.

The information processing device 10 includes a conference execution unit 21 for enabling a conference through the network 14. The conference execution unit 21 includes the above image taking unit, the above audio input unit, the above audio output unit, a display control unit, etc. The display control unit controls which element to be transmitted to the display device and how to display it.

Also, the information processing device 10 includes a determination criteria storing unit 22, an information obtaining unit 23, an element determination unit 24 and an element processing unit 25. The determination criteria storing unit 22 stores determination criteria, which are created in terms of each of the elements, for determining whether to continue transmission and reception of the element. The determination criteria storing unit 22 is implemented by a memory device such as a HDD. Regarding the determination criteria, it will be described later.

The information obtaining unit 23 obtains specified information related to each of the elements from the elements that are transmitted and received. The element determination unit 24 specifies what kind of information the information obtaining unit 23 should obtain and transmits the obtaining request for that information to the information obtaining unit 23. Also, the element determination unit 24 reads out the determination criteria from the determination criteria storing unit 22, refers to them and determines whether to continue transmission and reception of each of the elements from the information obtained by the information obtaining unit 23. The element processing unit 25, based on the determination result, instructs the transmission and reception unit 20 and causes the transmission and reception of each of the elements to continue or stop. Each of these units is implemented by having programs for performing these processes read out by a CPU from the memory device in which the programs are stored, and executed by the CPU.

The element determination unit 24, when requesting for obtaining the information, referring to a table in which types of elements are associated with specified information as shown in FIG. 3, can specify the information to be obtained. This table is stored in a table storing unit, which is not shown, and the element determination unit 24 can read it out when it is necessary, and can specify the information. The table storing unit can be implemented, the same as the above determination criteria storing unit 22, by a memory device such as a HDD, etc.

The element determination unit 24, when it specifies the information to be obtained, may specify all of the information for each element shown in FIG. 3, may freely select and specify some of the information, or may be able to select and specify only one. This selection can be implemented by, for example, a choice by a user.

The types of the elements are video information, audio information and screen image information. The specified information is information necessary for the element determination unit 24 to determine whether or not to continue the transmission and reception of that element based on the determination criteria that will be described later. Regarding the specified information for the video information, as examples, existence or non-existence (a number) of faces recognized by face recognition, color distribution of the video, a spatial change of the video, a change of the video as time goes by, etc., can be listed.

Because a conference is conducted by seeing each others' facial expressions, existence or non-existence of faces can be necessary information for the determination. In the case where targets to be seen such as faces, landscapes, etc., are included in the video, a tinge of color does not become a uniform screen color. On the other hand, in the case where the tinge of color is a uniform screen color, it can be assumed that there does not exist a target to be seen. Therefore, it can be said that information on the color distribution of the video, that is, information on whether the tinge of color is a uniform screen color or not, becomes necessary information for the determination.

Because the faces and landscapes are expressed in various colors, there is a spatial change. Therefore, whether there is a spatial change in the video or not can be necessary information for the determination. When someone is speaking in a conference, there is a change in the video as time goes by because mouths, hands, etc., move. Therefore, information on whether or not there is a change in the video as time goes by can be necessary information for the determination.

Regarding the specified information for the audio information, as examples, the loudness of the audio, a change in the audio as time goes by, etc., can be listed. When someone is speaking in a conference, audio of more than certain loudness is inputted and outputted. On the other hand, regarding surrounding noise, etc., they are inputted and outputted with less loudness. Therefore, information on whether or not audio is of more than certain loudness becomes necessary information for determining whether to continue the transmission and reception of audio information or not. When someone is speaking at a conference, because there are intonations or breathing variations, there is a change in audio as time goes by. Therefore, information on whether there is a change in audio as time goes by becomes necessary information for the determination.

Regarding the specified information for the screen image information, as examples, types of data, existence or non-existence of a change as time goes by, existence or non-existence of an input for the data, etc., can be listed. Whether the screen image information is related to the conference or not depends on the data type of the information. Therefore, information on what type of data becomes necessary information for determining whether to continue the transmission and reception of the screen image information. The screen images showing conference materials are switched according to the progress of the conference. Therefore, information on existence or non-existence of a change as time goes by becomes necessary information for the determination.

It is possible to input characters or to put a marking onto an important portion of the screen images displayed on the screen. The screen images for which these are inputted are the images that should be shown to the participating users. Therefore, information on whether there is an input for the data or not becomes necessary information for the determination.

Examples of specified information are described above. The specified information is not limited to these examples, but may be any other information as long as it is necessary information for determining whether or not to continue the transmission and reception of each element.

When the element determination unit 24 determines, it uses the determination criteria that are stored in the determination criteria storing unit 22. The determination criteria storing unit 22 can store a table in which types of elements are associated with determination criteria as shown in FIG. 4, and the element determination unit 24 can, from this table, read out and refer to the determination criteria corresponding to elements for which the determination should be made.

The types of the elements shown in FIG. 4 are, the same as those in FIG. 3, video information, audio information and screen image information. The determination criteria are the information used as criteria when performing the determination using the specified information shown in FIG. 3. Regarding the determination criteria for the video information, they are whether a face of a person is in the video, whether the video is of a uniform color, whether there is a spatial change in the video, whether there is a change as time goes by, etc., which can be determined by using the specified information.

Regarding the determination criteria for the audio information, they are whether the loudness of the audio has become low, whether there is a change in the audio as time goes by, etc. Regarding the determination criteria for the screen image information, they are what type of data is being exchanged, whether there is a change in the data itself as time goes by, whether there is any input for the data, etc.

Although, in FIG. 4, only determination criteria are listed, in the case where a special process is required to be performed, the table can be a table in which the content of the special process is further associated with the determination criteria, and which can be stored in the determination criteria storing unit 22. As an example of such a special process, a process in which the battery of the image taking unit is disconnected in the case where the transmission of the video information is stopped can be listed. This special process can be performed by the element processing unit 25.

Referring to the sequence chart shown in FIG. 5, a detailed process performed by the information processing device 10 will be described. The element determination unit 24 specifies what kind of information the information obtaining unit 23 should obtain and transmits the obtaining request for that specified information to the information obtaining unit 23. The information is "existence or non-existence of faces", "color distribution", etc., in the table shown in FIG. 3.

The information obtaining unit 23 requests the image taking unit, the audio input unit, audio output unit, etc., which are included in the conference execution unit 21, to obtain each element, and obtains each element from them. The information obtaining unit 23 returns the information to the element determination unit 24, which information is obtained by extracting information specified by the element determination unit 24 from the obtained elements.

The element determination unit 24 requests the determination criteria storing unit 22 for the determination criteria, and obtains the determination criteria. Then, the element determination unit 24 refers to the obtained determination criteria, and determines whether or not to continue the transmission and reception of each element using the information obtained from the information obtaining unit 23. The element determination unit 24 transmits a determination result, together with a process request, to the element processing unit 25.

The element processing unit 25 receives the process request, and performs the process for each element based on the transmitted determination result. The element processing unit 25, when the determination result is, for example, to continue the transmission of the element, does nothing and allows the transmission and reception unit 20 to continue the transmission of the element. On the other hand, the element processing unit 25, when the determination result is not to continue the transmission of the element, instructs the transmission and reception unit 20 to stop the transmission.

The element processing unit 25 is capable of, other than stopping the transmission described above, performing other processes such as instructing the conference execution unit 21, in the case, for example, where the element is the video information, to stop taking the video and to disconnect the battery of the image taking unit. Regarding the other processes, a process of stopping the audio input by the audio input unit and disconnecting the battery of the audio input unit, a process of stopping the audio output by the audio output unit and disconnecting the battery of the audio output unit, etc., can be listed.

Figure 6:
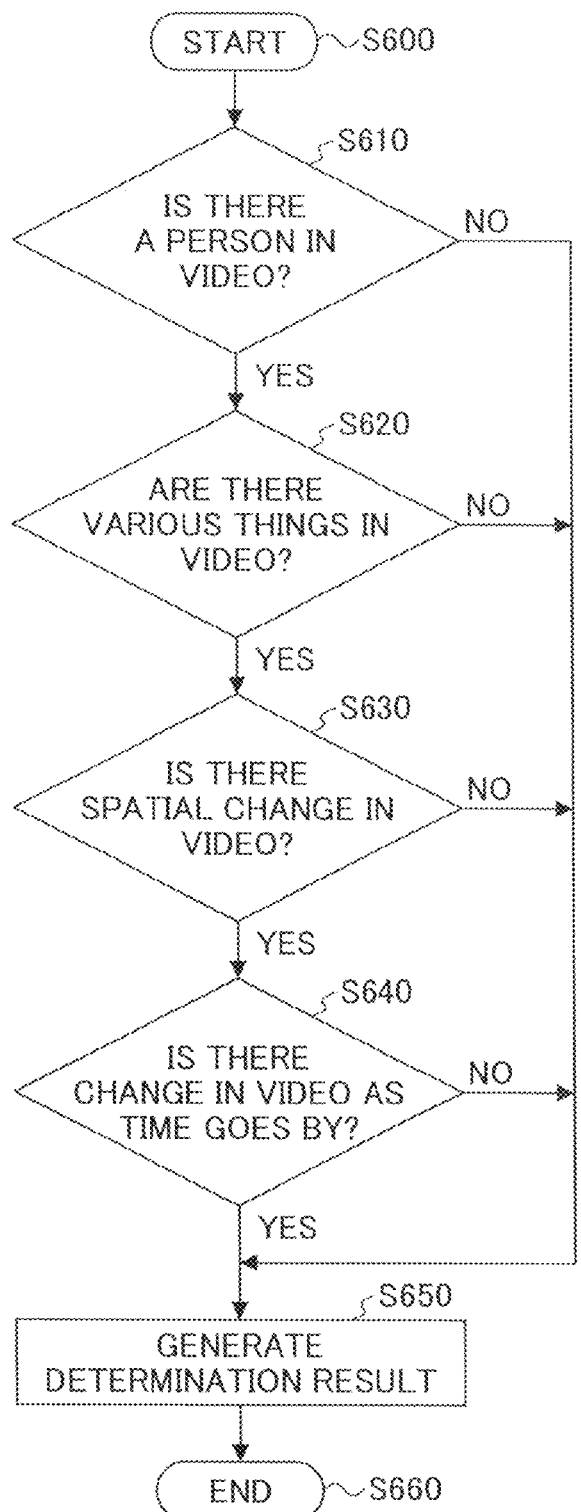
FIG. 6 is a flowchart in which flows of determination processes whether to continue transmission of video information as one of the elements are shown.

FIG. 6 is a flowchart illustrating an example of the determination process performed by the element determination unit 24 in the sequence chart shown in FIG. 5. In this example, it is assumed that the element is the video information. Also, this example may be either transmission or reception, but here it is described as transmission of the video information.

This determination process starts from step 600 and in step 610, it is determined whether a person is in the video. Here, a person is assumed but a face of a person may be assumed. In the case where a person is in the video, the flow moves to step 620 and it is determined whether there are various things in the video. Here, it is assumed to be determined whether there are various things, but it may be determined whether the video is of uniform color.

In the case where various things are in the video, the flow moves to step 630 and it is determined whether there is a spatial change in the video. In the case where there is a change, the flow moves to step 640 and it is determined whether there is a change in the video as time goes by. In the case where there is a change, in the case where there is not a person in the video in step 610, in the case where there are not various things in the video in step 620, or in the case where there is not a change in step 630 or in step 640, the flow moves to step 650 and the determination result is generated and this process is ended in step 660.

In the case where there is a change in step 640, the determination result of continuing the transmission of the video information is generated. On the other hand, in the case where there is not a person in step 610, in the case where there are not various things in step 620, in the case where there is not a change in step 630, or in the case where there is not a change in step 640, the determination result of stopping the transmission of the video information is generated.

FIG. 7 is a flowchart illustrating another example of the determination process performed by the element determination unit 24 in the sequence chart shown in FIG. 5. In this example, the element is assumed to be audio information. Also, this example may be either transmission or reception, but here it is described as transmission of the audio information.

This determination process starts from step 700, and in step 710, it is determined whether audio of more than a certain loudness is exchanged. In the case where audio of more than a certain loudness is exchanged, the flow moves to step 720 and it is determined whether there is a change in audio as time goes by. In the case where there is a change, or there is not a change, in step 720, or in the case where audio of more than a certain loudness is not exchanged in step 710, the flow moves to step 730 and the determination result is generated, and this process is ended in step 740.

In the case where there is a change in step 720, the determination result of continuing the transmission of the audio information is generated. On the other hand, in the case where audio of more than a certain loudness is not exchanged or in the case where there is not a change, the determination result of stopping the transmission of the audio information is generated.

FIG. 8 is a flowchart illustrating yet another example of the determination process performed by the element determination unit 24 in the sequence chart shown in FIG. 5. In this example, the element is assumed to be screen image information. Also, this example may be either transmission or reception, but here it is described as transmission of the screen image information.

This determination process starts from step 800 and it is determined whether a type of data of the screen image information is an allowed type. In short, it is determined whether the data is related to the conference. In the case where it is allowed, the flow moves to step 820 and it is determined whether there is a change in the data as time goes by.

In the case where there is a change, the flow moves to step 830 and it is determined whether there is an input for the data. In the case where there is an input, in the case where there is not an input, in the case where it is not allowed in step 810, or in the case where there is not a change in step 820, the flow moves to step 840 and the determination result is generated, and this process is ended in step 850.

In the case where there is an input in step 830, the determination result of continuing the transmission of the screen image information is generated. On the other hand, in the case where it is not allowed in step 810, in the case where there is not a change in step 820, or in the case where there is not an input in step 830, the determination result of stopping the transmission of the data of the screen image information is generated.

In these examples, for each element, all of the determination criteria are used to perform the determination process, but all of them may not be used, only any one of them may be used, or combined some of them may be used, to perform the determination process.

An example of a specific determination method will be described below. Here, only a case of the video information as an element will be described, but regarding the audio information or the screen image information, the same as the video information, the determination based on an analysis result can be performed.

Regarding the color distribution of the video, the video in a certain period of time is made into frames of images and it is determined by plotting color distribution of a plurality of images onto an xy chromaticity chart. The x and the y indicate the chromaticity. Here, the chromaticity is combined information of a hue that is a gradation of color and a colorfulness that is a scale of vividness of color.

Figure 9A:
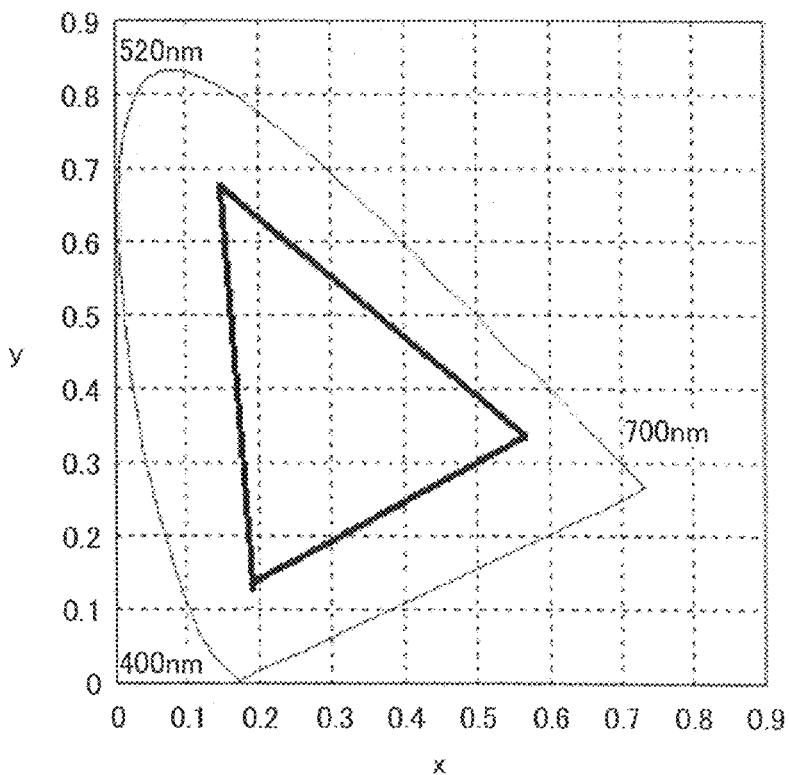
FIGS. 9A and 9B are drawings illustrating xy chromaticity charts created by using video frames captured at a certain time interval.
Figure 9B:
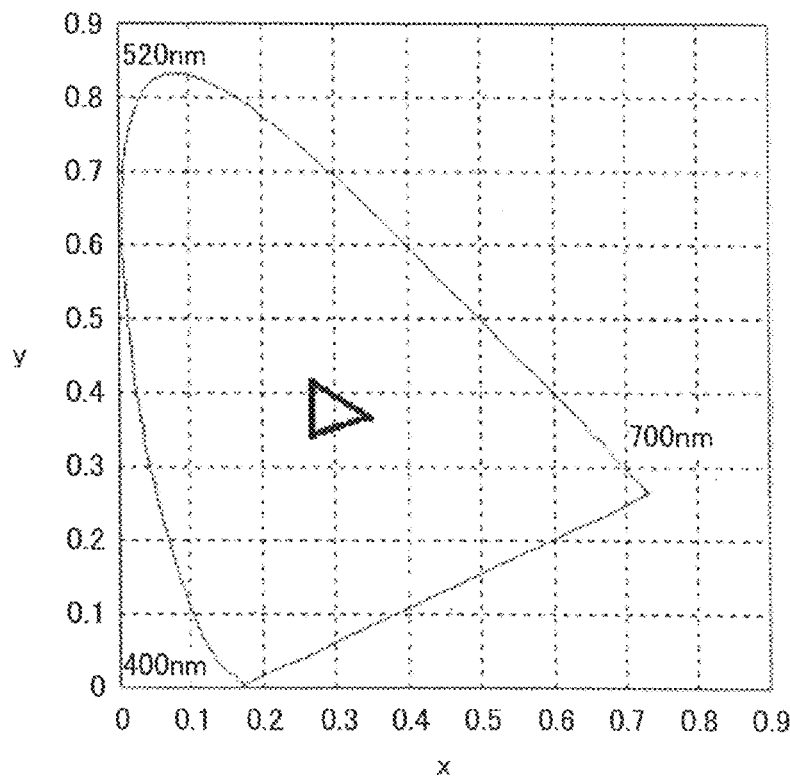

FIGS. 9A and 9B are drawings illustrating an example of an xy chromaticity chart on which the color distribution is plotted. A part shown as a triangle indicates a color gamut, and the bigger the area of the triangle is, the wider the color gamut is. Also, a part shown in a horseshoe shape surrounding the triangle indicates the chromaticity of monochromatic light of wavelengths 400 through 700 nm.

In the case where the area of the triangle is big and the color gamut is wide as shown in FIG. 9A, it can be determined that the video is not tinged with a uniform screen color. On the other hand, in the case where the area of the triangle is small and the color gamut is narrow as shown in FIG. 9B, it can be determined that the video is tinged with a uniform screen color. For example, by setting a threshold value for the area of the triangle, it is possible to determine that the video is not tinged with a uniform screen color if the area is equal to or more than the threshold value, and to determine that the video is tinged with a uniform screen color if the area is less than the threshold value.

Note that, it is necessary to calculate the chromaticity coordinates in order to plot onto the xy chromaticity chart. By transforming from a color system expressing a frame of an image to an xyY color system using a transformation formula, the chromaticity coordinates can be calculated. As a transformation formula, any formula known to date can be used.

Figure 10A:
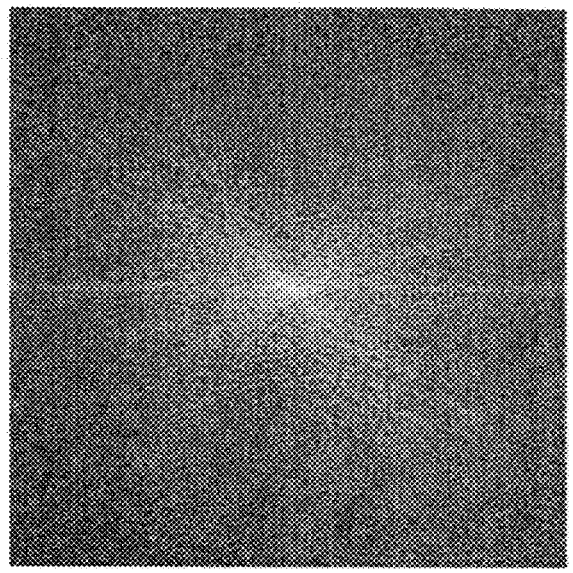
FIGS. 10A and 10B are drawings illustrating spectral images created by using video frames captured at a certain time interval.
Figure 10B:
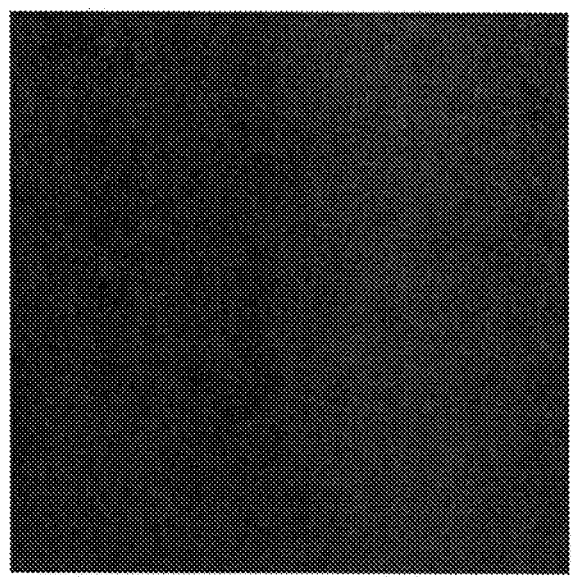

Regarding whether there is a spatial change of the video, it is determined by changing the video of a certain period of time into frames of images; applying two-dimension Discrete Fourier Transform to a plurality of images; and transforming the images into spectral images in which the spatial frequency characteristics can be seen. FIGS. 10A and 10B are drawings illustrating examples of the spectral images. By checking these spectral images, in the case where a color change exists in the image as shown in FIG. 10A, it can be determined that there is a spatial change of the video. On the other hand, in the case where a color change does not exist in the image as shown in FIG. 10B, it can be determined that there is not a spatial change of the video.

Figure 11A:
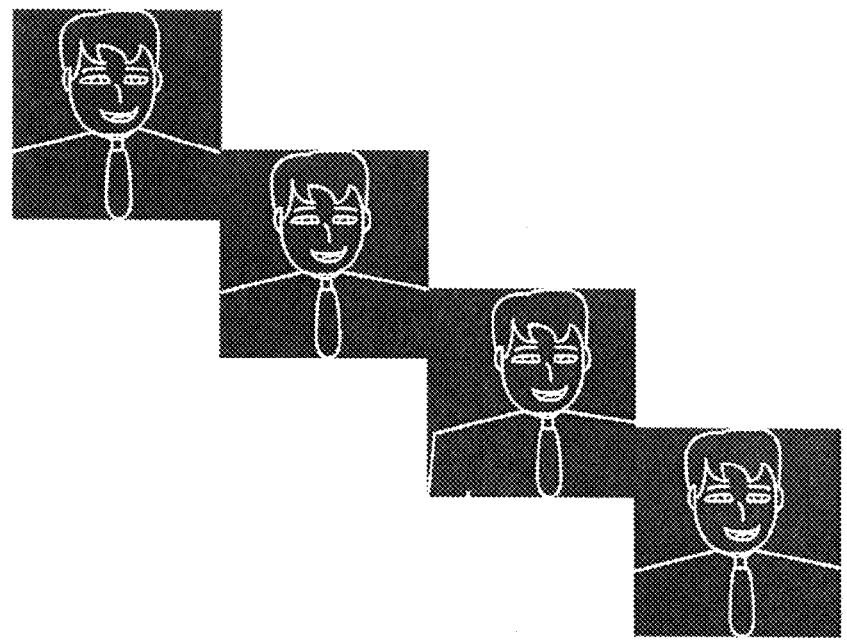
FIGS. 11A and 11B are drawings illustrating edge detection images created by using video frames captured at a certain time interval.
Figure 11B:
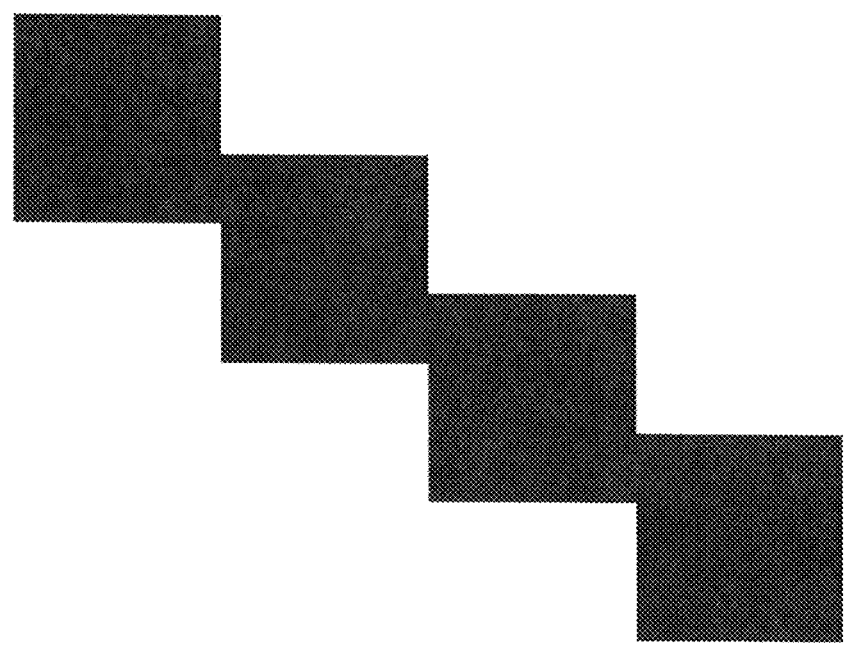

Regarding whether there is a change of the video as time goes by, it is determined by changing the video of a certain period of time into frames of images; applying an edge detection process to a plurality of images; and transforming them into images in which edges can be seen specifically. FIGS. 11A and 11B are drawings illustrating examples of such images.

Regarding the images that include edges indicated by white lines in FIG. 11A (edge detection images), it can be determined that there is a change in the video as time goes by in the case where differences are taken between the edge detection images for a certain period of time and the differences are not zero. That is, by taking pixel value differences of two images for all pixels whose coordinates correspond to each other, and checking whether all the differences are zeros, it can be determined whether there is a change in the video as time goes by.

The four images shown in FIG. 11A are lined up in chronological order. Because there are changes in the edges in the four images, the pixel value differences are not zeros. As a result, it is determined that there is a change in the video as time goes by.

On the other hand, even regarding the images that include edges as shown in FIG. 11A, in the case where the pixel value differences are zeros, or regarding the images that do not include edges as shown in FIG. 11B, it is determined that there is not a change in the video as time goes by.

The element processing unit 25 performs a process for each element based on the determination result determined by the element determination unit 24, and, referring to a table shown in FIG. 12, can perform process content set in the table. In FIG. 12, a type of an element is associated with content of a process. The types of elements are video information, audio information and screen image information. The content of the process is, regarding the video information, to stop transmission of video, or to stop reception of video; regarding the audio information, to stop transmission of audio, or to stop reception of audio; and regarding the screen image information, to stop transmission of data, or to stop reception of data. In this way, by excluding elements unnecessary for continuation of the conference, the continuity of conference can be improved even in the case where a network band is extremely narrow, or in an environment where the network band changes a lot.

FIG. 13 shows a table in which types of elements are associated with examples of obtained information by the information obtaining unit 23 and the content of processes. This table is not what the information processing device retains, but it just illustrates what kind of process is performed in the case of what kind of information. Here, only transmission related processes of elements are illustrated, and it is possible to put together reception related processes of elements into a similar table.

As examples of information related to the video information obtained by the information obtained unit 23, the transmitting video is all black or all white, there is no person, there is no change for a certain period of time, or there is more than certain amount of noise in the transmitting video, etc., can be listed. None of these are necessary for continuation of a conference, and so corresponding content of processes is to stop transmission of the video information.

As examples of information related to the audio information, there is no input for the transmitting audio, there is no change in the transmitting audio for a certain period of time, there is more than certain amount of noise in the transmitting audio, etc., can be listed. Also, as examples of information related to the screen image information, there is no change in the transmitting data for a certain period of time, there is no input for a certain period of time, there is more than certain amount of noise, etc., can be listed. None of these are necessary for continuation of conference, and so corresponding contents of processes are to stop transmission of the audio information, and to stop transmission of the screen image information, respectively.

Here, each process is associated with the corresponding element, but a process may be associated with a combination of elements.

So far, the present invention has been described using the embodiments that are implemented as an information processing device, a conference system, or a program that is executed by the information processing device. But, the present invention is not limited to these embodiments, and various variations and modifications may be made without departing from the scope of the present invention.

The present application is based on and claims the benefit of priority of Japanese Priority Application No. 2012-240702 filed on Oct. 31, 2012, with the Japanese Patent Office, the entire contents of which are hereby incorporated by reference.

What is claimed is:

1. An information processing device for transmitting and receiving, as elements, audio data of inputted audio, video data of video taken, and screen image data of a screen image to be shared, the information processing device comprising:
a memory configured to store determination criteria created separately for each the elements for determining whether to continue transmission or reception of the elements; and
circuitry configured to
analyze features included in the video data, audio data, and screen image data currently being transmitted or received to or from another information processing device, as part of an ongoing conference, over a network, wherein the screen image data is digitized information that is displayed as conference materials for the ongoing conference, and
determine whether or not to continue the transmission or the reception of the video data, audio data, and screen image data based on the analyzed features by referring to the determination criteria,
wherein the information processing device is connected to the another information processing device via the network, each of the information processing device and the another information processing device being termination points in the network, and the determination of whether or not to continue the transmission or the reception of the elements is made separately and independently for each of the video data, audio data, and screen image data being transmitted from the information processing device and the video data, audio data, and screen image data being received from the another information processing device, wherein the ongoing conference between the information processing device and the another information processing device continues even when the circuitry discontinues the transmission or reception of at least one of the video data, audio data, and screen image data based on the result of the determination, wherein the analyzed features included in the video data include a determination of a number of faces recognized by facial recognition, color distribution of the video data, a spatial change of the video data, and a change in the video data over a period of time, the analyzed features for the audio data include a volume of the audio data and a change in the audio data over a period of time, and the analyzed features of the screen image data include a data type for the screen image data, whether or not there is a change in the screen image data for a predetermined period of time, and whether or not there is any input received for the screen image data for a predetermined period of time.

2. The information processing device as claimed in claim 1, wherein the circuitry determines whether to continue or not the transmission or the reception of the elements by referring to one or more of the determination criteria stored in the memory.

3. The information processing device as claimed in claim 1, the circuitry being configured to continue or stop the transmission or the reception of the elements based on the determination of whether or not to continue the transmission or the reception of the elements.

4. The information processing device as claimed in claim 3, wherein the memory stores content of processes to be performed for the elements, which processes are associated with the determination criteria.

5. A conference system comprising:
the information processing device and the other information processing device according to claim 1, and
a control server connected to the network configured to control transmission and reception of the at least one of the audio data, the video data, and the screen image data between the information processing devices.

6. The information processing device as claimed in claim 1, wherein when the circuitry analyzes features included in the video data currently being transmitted or received to or from another information processing device, the circuitry is configured to determine to discontinue the transmission or the reception of video data when the analyzed features of the video data is at least one of: the video data includes all black or all white video data, there is no detected face in the video data, there is no detected change in the video data for a predetermined period of time, and there is more than a predetermined amount of noise in the video data.

7. The information processing device as claimed in claim 1, wherein when the circuitry analyzes features included in the audio data currently being transmitted or received to or from another information processing device, the circuitry is configured to determine to discontinue the transmission or the reception of audio data when the analyzed features of the audio data is at least one of: there is no voice input detected in the audio data, there is no change in the audio data for a predetermined period of time, and there is more than a predetermined amount of noise in the audio data.

8. The information processing device as claimed in claim 1, wherein when the circuitry analyzes features included in the video data currently being transmitted or received to or from another information processing device, the circuitry is configured to determine to discontinue the transmission or the reception of video data when the analyzed features of the video data is the video data includes all black or all white video data based on detecting a color distribution in the video data.

9. The information processing device as claimed in claim 8, wherein the color distribution is detected based on a detected chromaticity in the video data.

10. A non-transitory computer-readable storage medium storing a program for causing an information processing device to perform processes of transmitting and receiving, as elements, audio data of inputted audio, video data of video taken, and screen image data of a screen image to be shared, the information processing device including a memory configured to store determination criteria created separately for each of the elements for determining whether to continue transmission or reception of the elements, the program causing the information processing device to execute a method, the method comprising:

analyzing features included in the video data, audio data, and screen image data currently being transmitted or received to or from another information processing device, as part of an ongoing conference, over a network, wherein the screen image data is digitized information that is displayed as conference materials for the ongoing conference, and determining whether or not to continue the transmission or the reception of the video data, audio data, and screen image data based on the analyzed features by referring to the determination criteria, wherein the information processing device is connected to the another information processing device via the network, each of the information processing device and the another information processing device being termination points in the network, and the determination of whether or not to continue the transmission or the reception of the elements is made separately and independently for each of the video data, audio data, and screen image data being transmitted from the information processing device and each of the video data, audio data, and screen image data being received from the another information processing device, wherein the ongoing conference between the information processing device and the another information processing device continues even when the circuitry discontinues the transmission or reception of the at least one of the video data, audio data, and screen image data based on the result of the determination, wherein the analyzed features included in the video data include a determination of a number of faces recognized by facial recognition, color distribution of the video data, a spatial change of the video data, and a change in the video data over a period of time, the analyzed features for the audio data include a volume of the audio data and a change in the audio data over a period of time, and the analyzed features of the screen image data include a data type for the screen image data, whether or not there is a change in the screen image data for a predetermined period of time, and whether or not there is any input received for the screen image data for a predetermined period of time.

11. The non-transitory computer-readable storage medium as claimed in claim 10, further comprising:
continuing or stopping the transmission or the reception of the elements based on a determined result.

12. A method, implemented by an information processing device for transmitting and receiving, as elements, at least one of audio data of inputted audio, video data of video taken, and screen image data of a screen image to be shared, the information processing device including a memory configured to store determination criteria created separately for each of the elements for determining whether to continue transmission or reception of the elements, the method comprising:

analyzing features included in the video data, audio data, and screen image data currently being transmitted or received to or from another information processing device, as part of an ongoing conference, over a network, wherein the screen image data is digitized information that is displayed as conference materials for the ongoing conference, and determining whether or not to continue the transmission or the reception of the video data, audio data, and screen image data based on the analyzed features by referring to the determination criteria, wherein the information processing device is connected to the another information processing device via the network, each of the information processing device and the another information processing device being termination points in the network, and the determination of whether or not to continue the transmission or the reception of the elements is made separately and independently for each of the video data, audio data, and screen image data being transmitted from the information processing device and each of the video data, audio data, and screen image data being received from the another information processing device, wherein the ongoing conference between the information processing device and the another information processing device continues even when the circuitry discontinues the transmission or reception of the at least one of the video data, audio data, and screen image data based on the result of the determination, wherein the analyzed features included in the video data include a determination of a number of faces recognized by facial recognition, color distribution of the video data, a spatial change of the video data, and a change in the video data over a period of time, the analyzed features for the audio data include a volume of the audio data and a change in the audio data over a period of time, and the analyzed features of the screen image data include a data type for the screen image data, whether or not there is a change in the screen image data for a predetermined period of time, and whether or not there is any input received for the screen image data for a predetermined period of time.

* * * * *